Nov. 9, 1937.  M. J. WEBER ET AL  2,098,845
WEIGHING SCALE
Filed Sept. 27, 1934  4 Sheets-Sheet 1

Patented Nov. 9, 1937

2,098,845

UNITED STATES PATENT OFFICE 2,098,845

WEIGHING SCALE

Mathias J. Weber and Russell E. Vanderhoff, Chicago, Ill., assignors to Continental Scale Corporation, Chicago, Ill., a corporation of Delaware Application September 27, 1934, Serial No. 745,778

39 Claims. (Cl. 265—68)

Our invention relates in general to weighing scales and has more particular reference to that type of personal weight device commonly known as a bathroom scale.

An important object of the invention is to provide a scale of the character mentioned including weighing and indicating mechanism and a weight-receiving platform wherein the scale is of inexpensive construction and has unusual space efficiency as a result of the compact arrangement of its operating parts, further objects in this connection being to utilize the platform as a housing for the mechanism and to mount the weight indicating mechanism on the weight-receiving platform.

Another important object is to provide a weighing scale constructed substantially entirely of formed sheet metal parts, said parts being arranged to provide sufficient rigidity in the scale and particularly in the weight-carrying platform to nullify weight measuring error due to deflection of the relatively flimsy parts when the weight to be measured is applied thereto.

Another important object is to provide a weighing scale including a weight-receiving platform comprising a relatively flimsy shell of sheet metal having reinforcing elements or struts secured within the shell preferably opposite the position normally occupied by the feet of a person standing on the platform for the purpose of minimizing deflection thereof when loaded.

A further object is to utilize the shell strengthening struts to hold the indicator dial in place in the shell.

Another important object is to provide simplified and inexpensive means for setting the indicator opposite a predetermined graduation of a co-operating scale dial by mounting it in a support, which, in turn, is turnable about an axis eccentric with respect to the axis of rotation of the pointer element, said eccentric axis of the support being stationary with respect to the scale dial.

Another important object is to provide weight-indicating mechanism for a scale comprising a rotatable pointer element, a flexible indicator actuating member fastened to the rotatable pointer element, means associated with said flexible element to move the same in a direction to turn the pointer-carrying element on its axis in proportion to the amount of the weight being measured, and resilient means co-operatively associated with said pointer-carrying element and normally operative to urge the same about its axis in a direction to maintain said flexible element at all times under tension.

Another important object is to provide a scale including weighing mechanism comprising more than two individual levers, to each of which is applied a proportional part of the weight to be measured, and means for equalizing the movement imparted to the levers and applying the equalized movement to an indicator.

A further object is to connect the levers so that their weight-measuring movement may be applied to the indicator at a common point on a clevis.

Another important object resides in the construction of the clevis parts whereby the movement of the individual levers is applied to the resilient weighing element at a common point, a still further object being to form said clevis and the co-operating ends of the levers in such a way that when assembled in the clevis and mounted in the supporting frame, the levers have interlocking relationship with the clevis to prevent accidental disconnection thereof.

A further important object is to provide a scale having more than two weight-receiving levers, all suspended and acting upon a common resilient weight-measuring element; a further object being to form the common resilient weight-measuring element as a leaf spring.

A further object is to mount the weight-measuring levers upon a sub-base enclosed within a shell forming a weighing platform, said shell being formed with bearings adapted to rest on said levers; a further object being to adequately brace the shell against deflection when carrying a weight to be measured and to suspend the levers yieldingly on said shell by means of a resilient weighing element, such as a spring, anchored on the shell, and also to mount, on the shell, an indicator driven by the movement of the levers whereby the indicator and the weighing spring, together with the levers, may form an assembly unit adapted to be freely disassociated from the base by merely raising the levers and the shell from the said base; and a still further object of the invention being specifically to mount the indicator as well as the weighing spring on the platform shell and to suitably rigidify the shell in order to attain maximum accuracy and freedom from error.

A further object is to form the sub-base as a sheet metal strip forming a closed frame of preferably rhomboidal configuration with sheet metal means forming feet and upwardly facing fulcrum bearings at the corners of said frame and a further object being to incline the fulcrum bearings in the frame so that the levers supported thereon extend in directions meeting substantially at a common point.

A further object is to form the shell-carrying bearings as relatively flat surfaces in sheet metal legs carried by and within said shell, said flat surfaces terminating in an inclined shoulder at one end and the levers being formed each with a knife edge whereby the same will adjust itself on its bearing without binding.

Another important object is to form the levers of a weighing mechanism preferably as sheet metal strips with fulcrum and platform-carrying pivots comprising pins press fitted into and through perforations in the levers with the opposite ends of the pins projecting on opposite sides of the levers and a further object being to form at least the projecting portions and preferably the entire pin as a prism having at least two sides meeting to form a knife edge facing toward an edge of the lever forming strip.

A further object is to provide a scale including weighing mechanism comprising more than two weighing levers radiating from a common fulcrum point; a further object being to arrange two of the levers in alignment on opposite sides of the common fulcrum point with the remaining levers extending in directions at angles to the line of the aligned levers.

A further object is to arrange the aligned levers at the heel of the weight-carrying shell, that is to say, the end of the shell opposite from the weight-indicating dial, in order to permit minimum overhanging of the shell at the heel to eliminate tipping of the scale.

Another important object is to provide a scale including weighing mechanism comprising a plurality of levers mounted on a base with the levers suspended on a resilient weighing element, a weight-receiving platform carried by said levers and carrying the resilient weighing mechanism, and weight-indicating mechanism carried by said platform in position to be actuated in accordance with the movement imparted to the weighing element by said levers under the influence of a weight on the platform.

A further object is to arrange the leaf spring and the levers so that the deflection imparted to the spring is in an upward direction in response to downward movement of the platform under the influence of a weight.

A further object is to provide a weight-indicating mechanism comprising a bell crank lever carried by the platform and having an arm cooperatively associated with the leaf spring so that the bell crank is tilted on the platform in response to the deflection imparted to the leaf spring.

A further object is to provide holding means carried by the platform and engaging the frame or base on which the weighing levers are mounted whereby the base, levers, and platform are at all times held together in operative position, without effecting the operation of the scale, a further object being to form the holding means as a resilient element carried by the platform and operatively engaging the frame or base; and a still further object is to anchor said resilient holding means in lugs struck out from the shell.

A further object is to provide a scale of the character described having holding means for preventing the levers from disengaging the bearings.

Numerous other objects, advantages, and inherent functions of the invention will be apparent from the following description, which, taken in connection with the accompanying drawings, discloses a preferred embodiment of the invention.

Referring to the drawings.

To illustrate our invention, we have shown on the drawings, a weighing device particularly adapted for use as a so-called bathroom scale for the determination of the weight of a person, the scale being of neat and compact construction and having a weighing platform disposed close to the floor to permit a person to step upon the same readily.

The weighing device comprises weighing mechanism adapted to balance the weight being measured against a yielding weighing element or spring which preferably comprises a leaf spring 12. The weighing mechanism preferably comprises a plurality of levers 43 and 45, each independently fulcrumed as in a frame or sub-base 11, and each carrying a part of a weight applied to a platform 17 supported on the several levers of the system. The platform preferably comprises a formed sheet metal shell overlying the weighing mechanism and having depending skirt portions 61 enclosing the levers and sub-base, and the levers are preferably arranged to radiate from a focal point in the lever system, at which they are operatively connected, to means comprising a clevis assembly 14 by and through which the forces applied to the several levers may be united and applied at a single point on the resilient weighing element or spring 12. The spring 12 is preferably carried on and by the platform 17 and, in order to conserve space, the levers are preferably arranged to deflect the spring upwardly with respect to the platform as the same is moved downwardly on the levers under the influence of a weight on the platform. The scale also includes an indicator 16, and indicator-actuating mechanism 19, preferably carried by and mounted on the platform providing shell and arranged to indicate deflection of the spring 12 in terms of the weight carried on the platform which causes the deflection.

The indicating means 16 may be of any suitable form and preferably comprises a pair of relatively shiftable indicator elements comprising means forming a scale 161 and a co-operating pointer 171. We prefer to arrange the scale forming means as a dial 67 preferably stationarily mounted in the scale assembly, while the pointer is shiftably mounted in position to sweep across the scale. Obviously many features of the invention may be embodied in scales having other forms of indicator and we do not wish to restrict the scope of the invention in its broader aspects to an indicator comprising a stationary dial and relatively shiftable pointer.

The frame 11 provides legs 13, by which the same may be supported, and upwardly facing bearing supports 15. The weighing mechanism, comprising a series of levers 43, 45, and the weighing platform 17 are supported on the frame 11, the levers being supported on the seats 15 and the weighing platform 17 being supported on said levers. The weight indicator 16 and its actuating mechanism 19, are adapted for actuation by the movement of the levers under the influence of a weight deposited on the platform and are preferably mounted on and carried by the platform, the movement of the levers with respect to the base 11 being yieldingly resisted by resilient weighing means 21 preferably also carried by the platform. The indicating means 16 comprises a graduated scale adapted to indicate the deflection of the resilient weighing element 12 in terms of the weight of the object on the platform.

Figures 1, 5, 6, 7, 8, 13, 14:
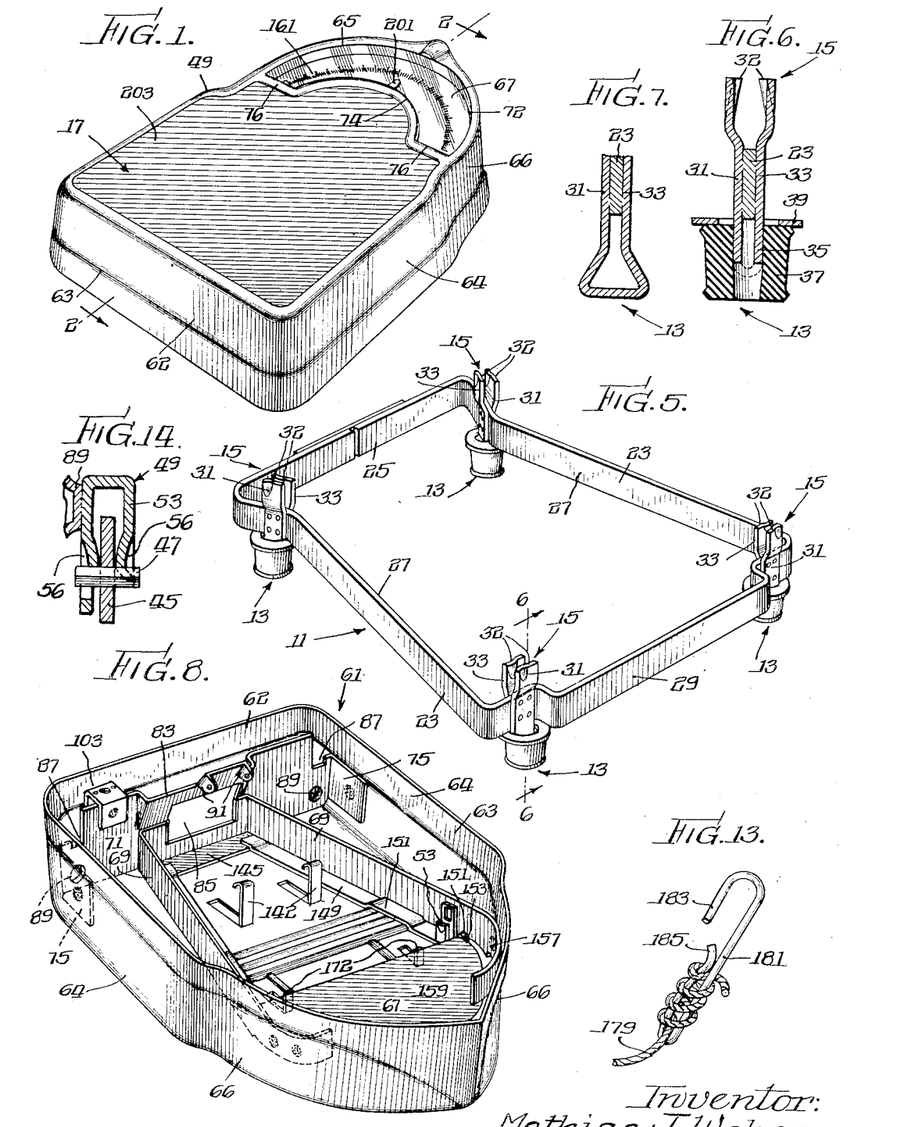
Figure 1 is a perspective view of a scale embodying my present invention, and comprising a shell forming a weight-receiving platform and enclosing weighing mechanism which is mounted on a frame or sub-base and which comprises a plurality of levers carrying the platform and connected to operate on a yielding weighing element within the shell.
Figure 5 is a perspective view of the sub-base or frame on which the weighing mechanism is carried.
Figure 6 is a section taken substantially along the line 6—6 in Figure 5 to show the construction of the support legs of said base.
Figure 7 is a sectional view showing a modified form of leg.
Figure 8 is a perspective view looking into the shell, which forms the platform and mechanism housing and showing shell re-enforcing means therein.
Figure 13 is a perspective view of a hook showing the manner of attaching the same to a flexible indicator actuating element forming a part of the scale.
Figures 10, 11, 12:
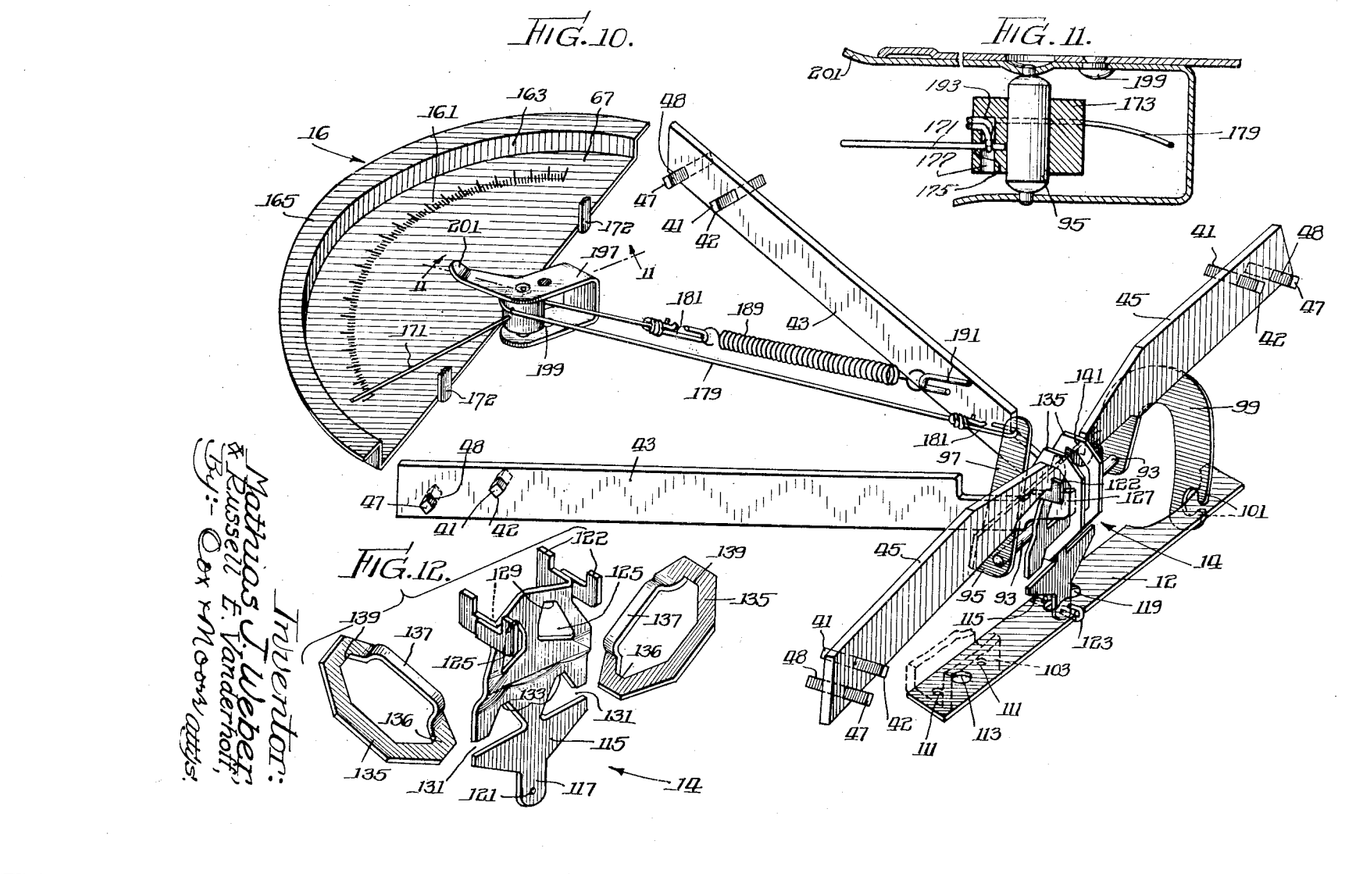
Figure 10 is a perspective view illustrating the weighing mechanism and the indicator and showing a plurality of levers radiating from a common focal point in the lever system.
Figure 11 is a sectional view taken substantially along the line 11—11 in Figure 10.
Figure 12 is a perspective view illustrating parts forming a clevis by means of which the levers are connected together and to the resilient weight measuring spring.

The frame 11 may be formed in any suitable, preferred or convenient manner and, as shown in Figure 5, preferably comprises a strip of sheet metal 23, bent to form a frame of preferably rhomboidal configuration having a short side 25, lateral sides 27 of equal length, and a long side 29. Support means comprising an upwardly facing bearing and a downwardly extending leg 13 is formed at each of the corners of the frame. The support means comprise each a pair of sheet metal strips 31 and 33 applied on opposite sides of the strip 23 and having downwardly extending portions 35. The metal strips 31 may comprise the arms of a single U-shaped strip if desired and the downwardly extending portion of each support carries a shoe 37 preferably of resilient material, such as rubber, there being preferably a washer 39 of stiff material received on said projecting ends 35 between the upper end of the shoe 37 and the lower edge of the strip 23 in order to provide an adequate bearing for said shoe. Alternately, the resilient shoes may be omitted and the legs 13 interconnected below the strip 23 and formed to provide supporting feet as shown in Figure 7. The strips 31 and 33 are offset above the strip 23 to provide spaced apart upstanding ears 32, the upper surfaces of which form the upwardly facing fulcrum bearings 15. The levers, forming the weighing mechanism, in the illustrated embodiment, are four in number, although certain features, functions, and advantages of the present invention may be accomplished with any desired number of levers. The levers preferably comprise sheet metal strips and each is provided with a fulcrum pin 41 intermediate its ends, said fulcrum pin being of any suitable configuration providing a lateral knife edge 42 therein. We prefer to form the pins as prisms of rectangular cross section and each pin is mounted by being preferably press fitted through an opening in the lever-forming strip with the opposite ends of the pin projecting from the opposite sides of said strip. The fulcrum pins are also mounted in the strips with the edge 42 facing downwardly, the fulcrum pins preferably being mounted in the lever-forming strips near the uppermost edge of the same. The fulcrum pins also are preferably mounted adjacent one end of the lever forming strips. The levers are supported on the frame 11, each lever extending between the spaced apart ears 32 of its support, which are distorted inwardly, as at 34 opposite the fulcrum pins, and formed with upwardly facing pin-receiving notches 36. The supports are preferably inclined in the frame 11 so that the ends of the levers, remote from the fulcrum, extend substantially to a common or focal point in the lever system. The levers 43, carried by the supports located at opposite ends of the short side 25 of the frame, are somewhat longer than the levers 45 carried by the supports located at opposite ends of the longer side 29 of the frame. The levers 43 extend from their supports in directions converging substantially to a focal point of the lever system at the mid-point of the longer side 29 of the frame, while the shorter levers 45 extend in substantial alignment from their respective supports toward the focal point of the lever system. The shorter levers 45 extend in the heel of the scale substantially parallel with the longer side 29 of the frame and support the hindmost portions of the platform to thus minimize the possibility of tipping up the forward or toe portions of the scale. Each of the levers is provided with a platform-carrying pin 47 disposed in the lever, on the side of the fulcrum, remote from the end of the lever, which is located at the focal point of the system; and it will be seen from an inspection of Figure 10 of the drawings that the levers 43 and 45 are so disposed that the platform-carrying pins 47 are located substantially at the corners of a rectangle in position to engage and support the lower end of the platform-carrying legs 49 formed on and extending downwardly of the platform 17. The platform-carrying pins 47 may, if desired, be similar to the fulcrum pins 41 and may be mounted in the levers in the same way, by press-fitting the pins into perforations shaped to receive them. The pins 47, however, are preferably located in the lever strips near the lower edge thereof and have an upwardly facing knife edge 48 adapted to receive the platform-carrying legs 49. These legs 49 comprise each a pair of preferably sheet metal strips 51, which may be formed as the spaced arms of a U-shaped element 53 and secured to the platform and formed at their lower ends to provide downwardly facing pin-engaging seats 54 and 55 adapted to rest upon the upwardly facing edges 48 of the pins 47, which are mounted in the levers near the lower edge of the same so that each lever is received between the spaced strips 51 forming a platform-supporting leg 49.

The platform 17 comprises a preferably sheet metal shell having a substantially flat top portion forming the platform 17 and marginal portions forming a peripheral skirt 61 extending downwardly of the marginal edges of the platform portion. The platform portion is preferably formed with strengthening ridges 18. The skirt comprises a portion 62 extending at the heel of the platform, opposite side portions 64 each merging at one end with an end of the portion 62, said portions 64 merging with skirt portions 66 at the toe of the shell. The skirt portions enclose the frame 11 and the levers resting thereon so that the shell not only forms a platform but also provides a housing or casing for the weighing mechanism. If desired, the lower portions of the skirt 61 may be offset outwardly near its lower edge in order to provide a peripheral bead 63 in the casing for the purpose of improving its appearance. The platform and case-forming shell is provided with an opening 65 preferably in the toe portions of the platform 17, and the weight-indicating mechanism carried by the shell includes a weight-indicating dial 67 disposed within the shell opposite said opening in position to be clearly visible to a person standing on the platform.

The shell is preferably formed of relatively thin gauge sheet metal, such as steel, the platform and skirt being formed as an integral shell by a pressing operation. Strengthening means, comprising preferably sheet metal struts and bracing means for rigidifying the shell, are secured therein to minimize deflection of the platform when loaded.

The indicator 16 is carried by the shell and comprises a preferably semi-circular disk or dial plate 67 carrying means on its upper surface forming a scale 161. The circular edge of the dial plate 67 is provided with an upstanding portion 163 terminating in an outstanding flange 165. We prefer to form the dial by pressing a circular plate, having upstanding preferably edge portions terminating in an outstanding annular flange. The inner surface of the bottom of this plate is provided with a pair of scales located on opposite sides of a diameter of the plate, which is then severed, along said diameter, to provide a pair of dial plates 67 having each a scale 161 marked thereon. If desired, however, the scale may be printed on a separate card and inserted and secured in the bottom of the dial plate. The dial plate 67 may be assembled in the housing behind a sheet of translucent material 167, such as glass, with the edges of the sheet 167 resting on and supported by the edges defining the opening 65. The outstanding portions 165 of the flange of the dial plate 67 rest on the underside of the translucent plate 167, with the upstanding portions 163 registering and in alignment with the outer curved edge of the opening 65. The straight edge 169 of the dial plate rests at its opposite ends upon buffers 153, which are carried by projecting portions 151 on the shell in position to support the dial plate in proper aligned position behind the opening 65. The outer edges of the flange 165 engage the curved inner surfaces of the skirt portions 66 so that in assembling the dial plate, it is merely necessary to drop the translucent plate 167 and the dial plate into the position determined by the buffers 153 and the inner surfaces of the skirt portions 66 and then bend the portions 159 carried by the shell into position behind the dial plate to hold the same in place. The buffers 153 afford resilient support for the dial plate 67 and the translucent plate 167, which may rock or swivel slightly in the shell about the holding means 159. Thus the dial plate is permitted to shift slightly in the casing to seat itself and resist damage when subjected to stress resulting from the application of a weight to the platform. This resilient mounting of the dial and translucent cover substantially prevents breakage or damage while the scale is in service.

In order to brace and strengthen the relatively flimsy shell, we preferably provide shell strengthening means within and secured to the shell. The strengthening means is utilized not only to render the shell more rigid but also to support parts of the weighing and indicating mechanism in place. The shell strengthening means provides a brace 71 between the opposite side portions 64 of the skirt, said brace extending preferably in the heel portions of the casing in parallel relatively closely spaced relationship with respect to the skirt portion 62 at the rear of the casing. The strengthening means also comprises a pair of struts 69 extending diagonally from spaced points of the brace and diverging outwardly toward the opposite side skirt portions 64, where the same merge with the toe forming portions 66 of the skirt and the struts are secured to the skirt on opposite sides of the dial opening 65. In order to accomplish maximum shell bracing effect, the struts 69 extend beneath the underside of the platform portion 17 of the shell beneath the portions normally occupied by the feet of a person standing on the platform.

The brace 71 preferably comprises a sheet metal stamping formed to provide a bracing plate 73, the opposite ends of which are provided with flanges 75 adapted to engage and be secured, in any suitable manner preferably by welding, to the inner surfaces of the opposite side skirt portions 64.

The side edge of the bracing portion 73 is formed with a flange 77, the corners of which are rounded as at 79 to fit into the opposite corners formed at the heel of the shell by the junction of the skirt portions 64 with the skirt portion 62. The flange 77 may be and preferably is secured to the underside of the platform 17 in any suitable manner, preferably by welding. When the brace is positioned and secured in the shell, the edges of this flange engage the depending skirt portion 62 at the heel of the shell and determine the spacement between the bracing plate 73 and said depending skirt portion 62. The clevis assembly 14 is mounted between the brace and the depending skirt portion 62 at the heel of the shell, and the side edge of the plate 73, opposite from the flange 77, is offset as at 81 to provide an offset portion 83 opposite the clevis assembly, which edge portion is inclined away from the lower edge of the skirt-portion 62, whereby to facilitate assembly of the clevis parts between the brace and the adjacent skirt portion 62 and also to facilitate the assembly of the focal ends of the levers on the clevis assembly.

The shorter levers 45 are carried on the frame 11 between the bracing plate 73 and the adjacent parallel portion 62 of the skirt, the plate 73 being notched as at 87, to receive the opposite sides 27 of the frame without interference. The long side 29 of the frame and the fulcrum supports at the opposite ends thereof are thus disposed between the brace plate 73 and the adjacent depending skirt portion 62 while the rest of the frame and the remaining fulcrum supports are on the opposite side of the plate 73. The plate 73 also is provided with a cutout opening 85 opposite the offset portion 83, through which opening the focal ends of the relatively long levers 43 extend in order to engage the clevis assembly.

The struts 69 may be formed as a single sheet metal element comprising an intermediate connecting portion 143, adapted to extend adjacent and be secured as by welding to the surface of the brace plate 73, and arms forming the struts extending at opposite ends of the portion 143 toward the toe of the casing. One edge of the portion 143 is provided with a flange 145 adapted to engage and be secured preferably by welding to the underside of the platform portion 17 of the shell. The edge of the portion 143, opposite from the flange 145, may be cut away as at 147 to conform with the opening 85 in the brace plate 73. The arms, forming the struts 69, are preferably formed along one edge with flanges 149, said flanges terminating short of the remote ends of said arms and being provided with upstanding fingers 151, on which are preferably mounted buffers 153 of preferably resilient material, such as rubber. The flanges 149 are adapted to underlie the platform portion 17 of the shell opposite the places normally occupied by the feet of a person standing on the platform and may be secured thereto in any desired fashion or manner and preferably by welding.

These flanges 149 are offset as at 155 to accommodate the ridges 18 formed in the platform portion of the shell. The arms, forming the strut 69, are continued beyond the ends of the flanges 155 to form portions 157 adapted to engage and be secured to the skirt portion 66 in the toe of the casing, said arms extending beyond the points at which the same are secured to the skirt of the casing to form ears 159 adapted to be curled inwardly of the said skirt portions into position engaging the bottom of the scale dial 67 for the purpose of holding the same in place opposite the dial opening 65.

The legs 49 may comprise strips of sheet metal 53 bent to substantial U-shape to provide spaced arms, one of which is provided with a notch 55 in its end to form a knife edge bearing for receiving the end of a pin 47 on one side of the lever in which the pin is mounted. The other arm 57 of the leg 49 is formed with a perforation 52, one edge of which defines a bearing forming a seat 54 for receiving the end of the pin 47 on the other side of the lever. The legs 49 may be secured on the shell by being mounted on the flanges 77 and 149, there being in the illustrated embodiment two of the legs 49 on the flange 77 near its rounded corners 79, a leg being mounted at each end of said flange, while the flanges 149 each carry a leg 49 adjacent the finger 151. The plate 73 and the webs of the struts 69 are offset as at 89 opposite the places, on the flanges 77 and 149, at which the legs 49 are mounted and the legs are secured in place preferably by welding the bend of each leg forming strip 53 to the flange on which it is mounted and by fastening one of the arms preferably the arm 57 to the webs 69 or 73, as the case may be, said arms being welded to the embossed portions 89. The legs 49 provide for the reception of the bearing pins 47 on opposite sides of the levers and the levers are assembled on the bearings so that one end of each bearing pin extends in a perforation 52 of its associated leg to thus prevent accidental disconnection of the pins by longitudinal displacement of the levers on the bearings. The other ends of the pins rest in the notches 55. The spaced arms of the legs 49 also may be distorted inwardly as at 56 opposite the places engaged by the pins 47 in order to reduce lateral movement of the levers between the legs to a minimum.

The edge of the offset portion 83 is provided with spaced lugs 91 forming a support for a pin 93, on which is tiltably mounted a lever 95, having an indicator actuating arm 97. The lever 95 has another arm 99, which is curved and which extends through the opening 85 into position, between the plate 73 and the adjacent skirt portion 62, to co-operatively engage the weighing mechanism, said arm 99 being formed with a pair of opposed fingers 101 adapted to receive therebetween the leaf spring 12, which forms a part of the weighing mechanism. Of course, we may utilize other than a leaf spring as the weight-measuring element and may connect the lever 95 with the weighing mechanism in other ways. However, there are certain advantages to be derived from using a leaf spring and making the connection in the fashion mentioned. The leaf spring is relatively inexpensive and can be readily mounted in operating position, and, by forming the arm 99 with the opposing teeth, we may adjust the position of the point of the contact of the arm on the leaf spring and thus alter its relationship with the weighing mechanism by merely bending the arm laterally to adjust the distance between its point of contact with the leaf spring and the point at which the spring is connected with the clevis assembly. By this simple expedient, we may regulate the total weight-indicating movement imparted through the lever 95 to the indicator and thus provide an adjustment for controlling the travel of the indicator in response to the deflection of the weight measuring element. The leaf spring is connected at one end on a mounting comprising a strip of sheet metal 103 carried by the brace member 71, preferably adjacent one end of the offset portion 83. The strip 103 has an end secured preferably by welding to the flange 77 and a portion extending thence in spaced apart position with respect to the brace plate 73, the strip being bent at its upper end to form a flat spring supporting portion 105 and is secured to the plate portion 73 adjacent the offset bend 81 in any suitable manner and preferably by welding. The flat portion 105 is or may be provided with a pair of upset projections 107 and a perforation 109, while the spring at one end is provided with openings 111 adapted to receive the projections 107 and a perforation 113 adapted to align with the perforation 109 of the spring mounting. Suitable fastening means, such as a nut and bolt, may be assembled in the aligned openings 109 and 113 in order to hold the spring on its mounting. Obviously, however, any suitable means may be employed to mount the spring in the scale assembly. The spring projects from its mounting behind the offset portion 83 of the brace and is received at its opposite end between the spaced teeth 101 of the arm 99. Means is provided on the spring intermediate the mounting and the arm 99 for connecting the spring to the clevis assembly.

The clevis assembly comprises a main plate 115, having a lug 117 adapted to extend through a slot 119 formed in the spring, said lug having a perforation 121 for receiving a fastening element comprising, in the illustrated embodiment, a piece of wire 123, which is passed through the perforation 121 and wrapped at its opposite ends around the side edges of the spring. The plate 115 has a pair of openings 125 adapted to receive the focal ends of the levers 43. These levers are provided with hooks defining notches 127, which notches rest upon and receive knife edges 129, comprising sides of the openings 125, so that when a weight on the platform bears upon the platform carrying pins 47, of the levers 43, the notched focal ends of the levers 43 will be urged upwardly and bear against the knife edges 129, thus urging the plate 115 upwardly, the upward movement being delivered to the leaf spring through the pin 123, so that the force applied to the levers 43 by the platform is applied to the spring at the connection 123. The plate 115 also has laterally opening slots 131 on its opposite sides intermediate the lug 117 and the openings 125. These slots 131 are enlarged inwardly of the edges of the plate 115 to provide knife edges 133 and the clevis assembly includes a pair of stirrups 135 having portions 136 adapted to be inserted through the slots 131 and providing bearings adapted to rest upon the knife edges 133. One side of each stirrup is offset as at 137 to clear the openings 125 when the stirrups are assembled in place and thus permit the hooked ends of the levers 43 to enter the openings 125 and rest upon the knife edges 129 without interference. The stirrups 135 are preferably continuous loops struck from sheet metal and have portions forming knife edges 139 formed therein opposite the portions 136. These knife edges 139 extend above the upper end of the plate 115 in position to receive the focal ends of the levers 45, which focal ends are hooked to provide notches 141 similar to the notches 127 in the focal ends of the levers 43.

The opposite corners at the upper end of the main clevis element 117 are formed to provide spaced arms 122, between which the levers 45 may extend into position seating at their notched ends in the knife edges 139 provided in the stirrups 135. These arms 122 prevent undue relative lateral movement between the notched ends of the arms 45 and the main clevis element, and the entire assembly is designed to permit the levers to be readily inserted in clevis assembly and rotated or angled into final assembled position, in which the levers interlockingly engage in the clevis assembly and may not be removed accidentally. While part of the weight carried on the platform is applied to the levers 43 and made effective upon the spring through the main clevis part 115, the balance of the weight is applied to the levers 45 and made effective on the spring through the stirrups 135 and the main clevis part 115. The force exerted on all of the levers is thus applied to impart an upward pull upon the spring at the connection 123 through the clevis assembly comprising the main part 115 and the stirrups 135. It will be noted that the levers are of different lengths and that each acts independently of the others in applying its portion of the load to the clevis assembly. We have, therefore, provided a plurality of independently operating levers and means for applying the forces carried by the several levers to a common point in the weight measuring element or spring. It is not, of course, essential to utilize four levers and the force equalizing and applying means may be utilized in connection with any number of independent levers. It will be noted also that although the levers are of various length, the fulcrum dimension, that is, the ratio of the distance from the fulcrum to the notched focal end of the lever, to the distance from the platform carrying pin to the notched focal length of the lever, is the same in all of the levers forming the system. It is, of course, possible to make the levers of the same length, although in the embodiment shown it is more convenient to utilize levers of different lengths.

Figures 2, 3, 4:
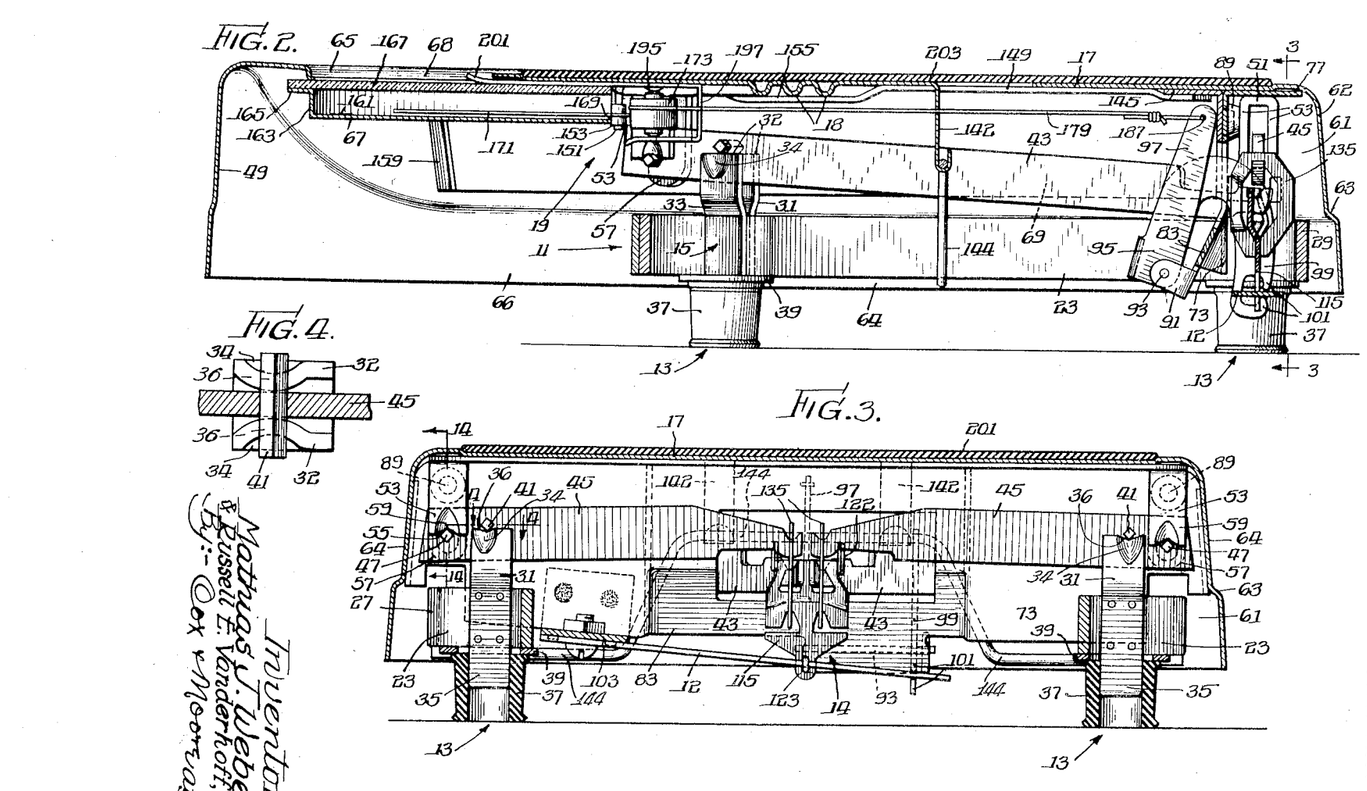
Figure 2 is a longitudinal section taken substantially along the line 2—2 in Figure 1.
Figure 3 is a vertical section taken along the line 3—3 in Figure 2.
Figure 4 is a horizontal section taken along the line 4—4 in Figure 3.
Figure 9:
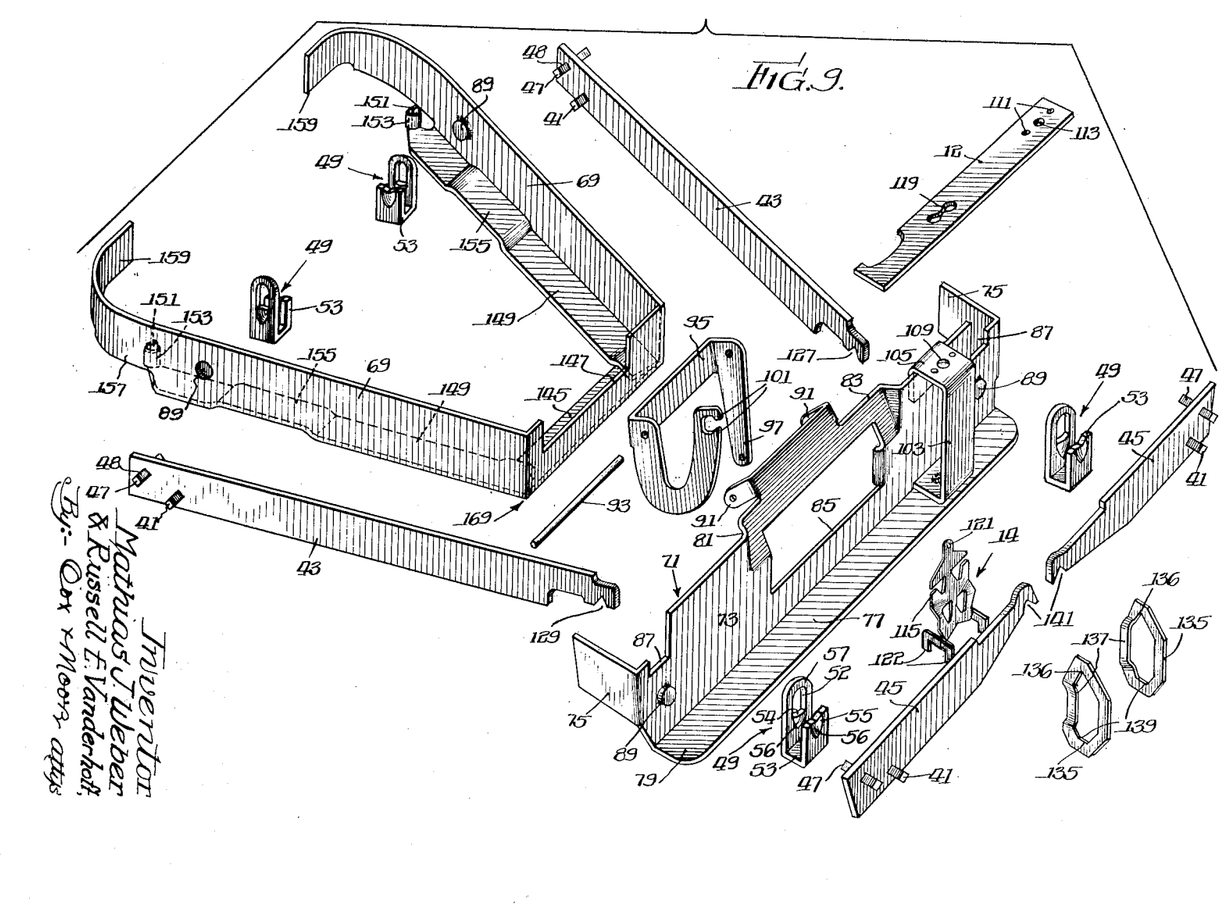
Figure 9 is a perspective view showing the elements forming the shell re-enforcing means and the relationship of the levers thereto.

It will be apparent that, when a weight is applied on the platform 17, the element 12 will be deflected upwardly due to the force exerted thereon through the upward movement imparted through the clevis assembly by the focal ends of the levers. The deflection of the element 12 will be proportional to the amount of the weight on the platform and by causing the deflection to be indicated on the scale 161, the weight being measured can be determined directly, providing the scale is properly calibrated to show the deflection in terms of weight. In order to indicate the deflection on the scale 67, the movement of the element 12 is transferred through the lever 95 to the indicator actuating mechanism 19. The lever 95 is preferably formed as a sheet metal stamping and it will be obvious that the arm 97 will be moved about the pivot 93 in a counter-clockwise direction, viewing Figure 2, when the element 12 is deflected upwardly in response to the application of a weight to be measured on the platform.

The indicator comprises a shiftable element carrying the pointer 171 and is connected for actuation in response to the movement of the arm 97 so as to relatively displace the pointer and the scale a distance proportional to the amount of the applied weight on the platform. In the illustrated embodiment, the shiftable indicator element comprises a pulley 173 carried by the shell. The pulley has a radial socket 175 extending inwardly from its peripheral surface and a channel 177 extending from one end of the pulley and substantially parallel with the axis thereof to intersect the socket 175. The pointer 171 preferably comprises a length of relatively stiff yet light material, such as piano wire, although, of course, the pointer element may have any preferred form and construction. One end of the pointer is inserted in the socket 175 and crimped therein by means of an instrument applied through the channel 177 to bend the inner end of the wire and thus secure it in the socket. In order to rotate the pulley in response to the movement of the lever 95 to thus relatively displace the pointer on the scale, a flexible driving element 179 is utilized. This element is connected, intermediate its ends, to the periphery of the pulley and extends from its point of connection in opposite directions around the pulley. The free ends of the flexible member, which is preferably a string or cord, are provided with fasteners 181 which preferably comprise a length of wire bent at one end to provide a hook 183 and having a portion 185 at the opposite end of the fastener bent to facilitate rapid yet secure attachment of the flexible connecting cord 179 to the hook without necessarily knotting the flexible cord substantially in the manner shown in Figure 13. One of the free ends of the cord 179 is connected as by attaching the hook 183 in a perforation 187 formed in the end of the lever arm 97. The remaining free end of the flexible connecting cord is attached by means of its associated fastener to one end of a mild spring 189, the other end of which spring is attached to the shell as by hooking it over an anchor 191 formed on or fastened to the shell. The anchor 191 is preferably formed by striking out an ear in the shell during the formation of the same. In order to attach the flexible member 179 to the pulley, a channel 193 is formed therein inwardly from the peripheral surface of the pulley substantially adjacent and parallel to the pointer. holding socket 175. A looped portion of the flexible member 179 is inserted in the channel 193 and may be held in place therein by being looped around the peened portion at the inner end of the pointer. Obviously the pulley and the pointer may be made in any other suitable or convenient fashion and the member 179 fastened on the pulley in any other suitable way than the manner described. However, we prefer to utilize the construction described since the same is simple and inexpensive to manufacture.

It will be seen that the spring 189 exerts a rotative urge on the pulley to drive it in a direction causing the pointer to advance along the scale. Movement of the pointer, however, is prevented by the opposing pull exerted on the end of the connector 179, which is attached to the lever 95. The position of the lever 95, which is, of course, determined by the deflection of the spring 12 under the influence of a weight applied on the platform, determines the position of the flexible connector 179, which, in its turn, determines the relative angular position occupied by the pointer 171 and the pulley under the influence of the spring 189. As the spring 12 is deflected upwardly by the application of a weight on the platform, the upper end of the lever arm 97 moves toward the left in Figure 10, permitting the pointer 171 to be moved from the zero position illustrated along the scale under the influence of the spring 189 a distance proportional to the deflection of the spring. The shell is preferably provided with stops, preferably struck out lugs 172, for limiting the travel of the pointer 171 at the opposite ends of its path of travel over the scale dial.

The pulley 173 may be journalled in the shell in any suitable fashion as on the shaft 195 and, in order to offset the gain and loss effects in the travel of the pointer due to the change in angularity of the lever arm with respect to the connector 179 within the limitation of its travel, the pulley 173 may be mounted on the pin in such a way that the circumference of the pulley is slightly eccentric with respect to its axis of rotation. The gain and loss effect arises because the angular motion of the lever 97, which is substantially proportional to the deflection of the spring, is made effective upon the connector 179 as a function of the vertical projection of the lever so that the movement imparted to the connector 179 and hence to the pointer 171 is substantially in accordance with the laws of simple harmonic motion and the pointer is deflected proportionately less than it should be during its travel over the initial and final portions of the scale, and proportionately more than it should be during its travel over the intermediate scale portions.

By arranging the circumferential pulley surfaces slightly eccentric with respect to the axis of rotation of the pulley, these errors may be entirely eliminated by increasing the pointer displacement per unit movement of the flexible member during its movement over the initial and final portions of the scale and reducing pointer displacement during its travel over the intermediate scale portions. We also prefer to mount the pulley in a frame 197, which is shiftable on the shell in order to provide an adjustment for setting the pointer to a predetermined scale graduation, for instance, the pointer should be adjusted opposite the zero graduation of the scale when there is no weight on the platform. By shifting the rotary axis of the pulley on the shell with the actuating member 179 held in fixed position, it will be seen that the pulley may be slightly rotated with respect to the frame 197 and this will cause the pointer to be adjusted with respect to the scale. The frame 197 preferably comprises a strip of sheet metal bent to substantially U-shape to provide spaced arms in which the pulley axle 195 may be mounted. This frame also is preferably mounted for tilting movement as by means of a pin 199 which is positioned in eccentric relationship with respect to the pulley axle so that by tilting the frame on the shell, the position of the pulley axle with respect to the frame and hence with respect to the scale dial may be adjusted. The frame 197 is provided with a handle 201, which may be formed as an extension of one arm of the frame and which extends into the opening 65 above the translucent cover plate 167, the plate-supporting flange 68, defining said opening 65, being cut away to permit the handle 201 to be moved laterally above the dial in making the zero setting adjustment. The opening 65 is of curved shape defined by an outer semi-circular arc 72 and an inner semi-circular arc 74, the opposite ends of which arcs are connected by preferably straight edges 76; and the handle 201 has a tip projecting into the opening and movable along the arcuate edge 74. The platform portion 17 of the shell may be provided in its upper surfaces with a finishing pad 203 of suitable composite material, such as rubber, which may be cemented or otherwise secured to the upper surface of the platform 17 in a depression formed therein. The depression and pad preferably have portions extending closely adjacent the inner arcuate edge 74 of the opening 65 in order to improve the appearance of the scale. The finishing pad 203 not only improves the appearance of the finished scale and provides a comfortable standing surface, but also serves to conceal the openings made by striking out hooks 142 and 191 and the pointer stops 172, as well as the strengthening flutes 18 formed in said platform portion.

It will be seen that the scale is of compact construction and, on account of its sheet metal construction, is extremely light. The casing being of sheet metal, may be provided with a plated finish or its exposed surfaces may be painted in attractive colors to provide an article for use by the most fastidious. This scale also, on account of its inexpensive construction, may be supplied at low cost yet the device is sufficiently rugged and serviceable to provide accurate weight-indicating ability over long periods of service without attention, the sheet metal shell, forming the platform and housing, being sufficiently strong, particularly when re-enforced as heretofore described, to protect the weight measuring and indicating mechanism housed therein. The re-enforcements provided also eliminate deflection of the platform to a degree such that errors will not be introduced.

Another extremely important feature resides in the simplicity of the scale and its parts, which, with the exception of the pulley 173 can be manufactured as sheet metal stampings and in the fact that the parts are arranged to facilitate and reduce the cost of assembly. The parts are assembled by welding or otherwise attaching the legs 53 in place on the brace and strut elements 69 and 71, which are then mounted and secured together in the shell as by welding. The lever 95 may then be assembled on its mounting and the spring 12, with the clevis assembly 14 attached, secured in place. The dial and indicator mechanism may then be mounted in the shell and the levers 43 and 45 assembled with their ends in the clevis and the pins 47 resting on the legs 53. After that, it is merely necessary to drop the sub-base 11 into place in the shell and apply the resilient holding element 144 in place.

If desired, a cover, comprising a sheet metal plate, secured at one end to the mid-portions of the element 144, between its mounting lugs 142 and formed at its other end for detachable interfitting engagement with the straight edge of the dial plate, may be provided to enclose the flexible connector, the pulley, and the spring and protect the same from below.

It will thus be seen that the indicator is carried on the platform. The weighing spring 12 also is anchored at one end on the platform and connected with the lever system, the levers of which are adapted for assembly on lever bearings formed on the platform. The platform which is preferably of sheet metal is suitably rigidified by bracing means on which the spring anchorage and also the lever bearings are formed. This construction insures accuracy in an extremely inexpensive scale construction. After the indicator, the spring, the levers and the interconnecting elements are assembled on the platform, the frame or base 11 may be assembled merely by dropping it into place upon the levers, and the parts may be held in opposing position by suitable means for latching and holding the base and frame loosely together.

It is thought that the invention and numerous of its attendant advantages will be apparent from the foregoing description, and it is obvious that numerous changes may be made in the form, construction, and arrangement of the various parts without departing from the spirit or scope of our invention or sacrificing any of its attendant advantages, the forms herein described being preferred embodiments for the purpose of illustrating our invention.

Having thus described our invention, what we claim as new and desire to obtain by Letters Patent of the United States is:

1. A weighing scale comprising a support frame, weighing mechanism comprising a system of interconnected levers fulcrumed on said frame, and a weight receiving platform carried by said levers, resilient weighing means connecting said levers on said platform, and an indicator comprising a graduated dial element carried on said platform and a pointer element mounted on the platform in position extending above said dial, one of said elements being turnable on said platform with respect to the other, said other being fixed on the platform and means carried by said platform and drivingly connecting said turnable element with said levers.

2. A weighing scale comprising a support frame, weighing mechanism and a weight receiving platform carried by said frame wherein the platform comprises a sheet metal shell, and strengthening means for said shell comprising brace and strut forming means, said brace means extending between the opposite sides of said shell adjacent the heel thereof, said brace having a flange extending beneath the platform portion of said shell, platform-carrying legs secured to said brace, said strut means extending from said brace means, intermediate the ends thereof, to the marginal portions of said shell adjacent the toe thereof, said strut means having flanges underlying and secured to the platform portion of said shell, platform-carrying legs secured to said strut means, said platform-carrying legs resting upon said weighing mechanism.

3. A weighing scale comprising a support frame, weighing mechanism, a weight carrying platform and an indicator carried by said frame, said indicator comprising a turnable element and a relatively stationary element, one of said elements forming a pointer and the other a scale associated with said pointer, means drivingly connecting the rotatable element with the weighing mechanism, and means to shift the axis of the rotatable element with respect to the stationary element.

4. A weighing scale comprising a support frame, weighing mechanism, a weight carrying platform and an indicator carried by said frame, said indicator comprising a pointer element and a cooperating scale forming element associated with said pointer element, one of said elements being rotatable with respect to the other, means drivingly connecting the rotatable element with the weighing mechanism, a frame in which the rotatable element is mounted for turning movement about its axis, said frame being itself adjustably tiltable about an axis eccentric with respect to the axis of the rotatable element in order to set the pointer opposite a desired scale graduation.

5. A weighing scale comprising a support frame, weighing mechanism, and a weight carrying platform supported on said frame, an indicator comprising a cylindrical element rotatable with respect to the platform, a flexible driving element embracing the peripheral surfaces of the cylindrical element and drivingly connected with said weighing mechanism for the purpose of turning said cylindrical element, and a projecting pointer mounted on said cylindrical element and serving to secure the driving element on the cylindrical element.

6. A weighing scale comprising a support frame, weighing mechanism comprising a system of levers fulcrumed on the frame, a weight carrying platform supported on said levers, indicator means carried on said platform, a resilient weighing spring carried by and connected on the platform and drivingly connected with said system of levers whereby to suspend said system on the platform, and means drivingly connecting said levers with the indicator means.

7. A weighing scale comprising a support frame, weighing mechanism, and a weight carrying platform supported on said frame, indicator means on said platform, a tiltable lever on said platform and drivingly connected with the weighing mechanism, and means drivingly connecting said lever with said indicator.

8. A weighing scale comprising a support frame, weighing mechanism, and a weight carrying platform supported on said frame, said platform having a toe portion and a heel portion, an indicator carried by said platform in the toe portion thereof, transmission means mounted on the platform rearwardly of said toe portion, said transmission means being drivingly connected with the weighing mechanism, and means drivingly connecting the transmission means with said indicator.

9. A weighing scale as set forth in claim 8, wherein the transmission means comprising a bell crank having an arm drivingly connected with the weighing mechanism and another arm drivingly connected with the indicator.

10. A weighing scale as set forth in claim 8, wherein said weighing mechanism includes resilient weighing means connected on the platform and said transmission element comprising a bell crank having an arm bearing on said resilient element and another arm drivingly connected with said indicator.

11. A weighing scale comprising a support frame, weighing mechanism, and a weight carrying platform supported on said frame, an indicator comprising a cylindrical indicator element mounted in the scale assembly for rotation about an axis eccentric with respect to its cylindrical surfaces, a projection forming a pointer carried by said element and a flexible driving member embracing the cylindrical surfaces of said element for the purpose of rotating the same.

12. A weighing scale comprising a support frame, weighing mechanism, a weight receiving platform and an indicator carried by said frame, said weighing mechanism comprising a plurality of independent levers each fulcrumed in remote portions of said support, said levers having ends extending substantially to a common focal point, and means at said focal point interconnecting said levers with the indicator.

13. A weighing scale comprising a support frame, weighing mechanism and a weight receiving platform carried by said frame, said weighing mechanism comprising a resilient weighing element and a plurality of levers, each lever being independently carried by the support and said platform being carried in part by each of the several levers, and connecting means interconnecting each of the several levers at a common point on the weighing element.

14. A weighing scale comprising a support frame, weighing mechanism and a weight receiving platform carried by said frame, said weighing mechanism comprising a resilient weighing element and a plurality of levers, each lever being independently carried by the support and said platform being carried in part by each of the several levers, and connecting means interconnecting each of the several levers at a common point on the weighing element, said connecting means comprising a clevis assembly including an element having point connection with the weighing element and providing means for receiving thereon the thrust of said levers, whereby the thrust of each lever may be applied to the resilient weighing element at its connecting point with said clevis element.

15. A weighing scale comprising a support frame, weighing mechanism and a weight receiving platform carried by said frame, said weighing mechanism comprising a resilient weighing element and a plurality of levers, each lever being independently carried by the support and said platform being carried in part by each of the several levers, and connecting means interconnecting each of the several levers at a common point on the weighing element, said connecting means comprising a clevis assembly including a clevis element having point connection with the weighing element and providing a pair of knife edges, a stirrup hung on each of said knife edges, each stirrup connected with one of said levers to receive the thrust thereof, whereby the thrust imparted by the levers on said clevis element through the intermediary of said stirrups may be applied to the weighing element at its point of connection with said clevis element.

16. A weighing scale comprising a support frame, weighing mechanism and a weight receiving platform carried by said frame, said weighing mechanism comprising a resilient weighing element and a plurality of levers, each lever being independently carried by the support and said platform being carried in part by each of the several levers, and connecting means interconnecting each of the several levers at a common point on the weighing element, said connecting means comprising a clevis assembly including a clevis element having point connection with the weighing element and providing a pair of knife edges, a stirrup hung on each of said knife edges, each stirrup connected with one of said levers to receive the thrust thereof, said clevis element having an additional knife edge adapted to receive another of said levers whereby the thrust imparted by the levers on said clevis element either directly or through the intermediary of said stirrups may be applied to the weighing element at its point of connection with said clevis element.

17. A weighing scale comprising a support frame, weighing mechanism and a weight receiving platform carried by said frame, means at spaced intervals in said frame forming depending legs and upwardly projecting lever bearing means, and said weighing mechanism comprising a plurality of levers each fulcrumed on one of said bearing means.

18. A weighing scale comprising a continuous or closed loop forming a frame, means forming depending legs and upwardly projecting bearings at spaced intervals in said frame, and weighing mechanism comprising interconnected levers fulcrumed on said bearings and forming a counterbalance lever system.

19. A weighing scale comprising a support frame, weighing mechanism and a weight receiving platform carried by said frame, means forming spaced-apart, depending legs and upwardly projecting lever bearings on said frame, said weighing mechanism comprising a plurality of levers, each fulcrumed on one of said bearings, said support frame comprising an element forming a closed quadrilateral loop, the legs being disposed substantially at the corners of said loop.

20. A weighing scale comprising a support frame, weighing mechanism and a weight receiving platform carried by said frame, means forming spaced-apart, depending legs and upwardly projecting lever bearings on said frame, said weighing mechanism comprising a plurality of levers, each fulcrumed on one of said bearings, said frame comprising a sheet metal strap, support means at spaced intervals on said frame comprising a co-operating pair of legs secured on opposite sides of said strap, said legs extending downwardly of said strap to provide a foot for said frame and extending upwardly of said strap to form spaced apart lever bearings, said weighing mechanism comprising a plurality of levers supported each between a co-operating pair of said legs and carrying oppositely extending means forming knife edges engaging said spaced lever bearings.

21. A weighing scale comprising a support frame, weighing mechanism and a weight receiving platform carried by the frame, said mechanism comprising a plurality of perforated levers, a fulcrumed pin fitted in a perforation of each lever and providing a downwardly facing knife-edge on opposite sides of each lever, said support formed with spaced projections defining spaced upwardly facing fulcrum bearings, each lever being assembled between a pair of bearings with its associated knife edges resting thereon.

22. A weighing scale comprising a support frame, weighing mechanism and a weight receiving platform carried by said frame, said platform being formed with a plurality of platform supports providing each a spaced pair of downwardly facing bearings, said weighing mechanism comprising levers each fitted with a bearing pin extending on opposite sides thereof and defining upwardly facing knife edges in position to engage the spaced bearings provided by one of said platform supports.

23. A weighing scale comprising a frame forming a support element, weighing mechanism and a weight receiving platform element supported on the frame, said mechanism comprising a plurality of levers formed with perforations, a fulcrum pin fitted in one of said perforations and providing aligned knife edges on opposite sides of a lever, one of said elements having spaced apart portions providing fulcrum bearings adapted to receive the lever therebetween with said aligned knife edges resting in said bearings on opposite sides of the lever.

24. A weighing scale comprising a frame forming a support element, weighing mechanism and a weight receiving platform element supported on the frame, said mechanism comprising a plurality of levers formed with perforations, a fulcrum pin fitted in one of said perforations and providing alined knife edges on opposite sides of a lever, one of said elements having spaced apart portions providing fulcrum bearings adapted to receive the lever therebetween with said alined knife edge resting in said bearings on opposite sides of the lever, said lever comprising a sheet metal strap and the fulcrum pin being drivingly fitted in the perforation.

25. A weighing scale comprising a frame forming a support element, weighing mechanism and a weight receiving platform element supported on the frame, said mechanism comprising a plurality of levers formed with perforations, a fulcrum pin fitted in one of said perforations and providing alined knife edges on opposite sides of a lever, one of said elements having spaced apart portions providing fulcrum bearings adapted to receive the lever therebetween with said alined knife edge resting in said bearings on opposite sides of the lever, said perforation comprising a square opening in the lever and the fulcrum pin having a corresponding sectional configuration.

26. A weighing scale comprising a frame forming a support element, weighing mechanism and a weight receiving platform element supported on the frame, said mechanism comprising a plurality of levers formed with perforations, a fulcrum pin fitted in one of said perforations and providing alined knife edges on opposite sides of a lever, one of said elements having spaced apart portions providing fulcrum bearings adapted to receive the lever therebetween with said alined knife edges resting in said bearings on opposite sides of the lever, said lever comprising a sheet metal strap and the fulcrum pin being a hardened steel prism.

27. A weighing scale comprising a frame forming a support element, weighing mechanism and a weight receiving platform element supported on the frame, said mechanism comprising a plurality of levers formed with perforations, a fulcrum pin fitted in one of said perforations and providing alined knife edges on opposite sides of a lever, one of said elements having spaced apart portions providing fulcrum bearings adapted to receive the lever therebetween with said alined knife edge resting in said bearings on opposite sides of the lever, said spaced-apart bearing portions comprising sheet metal strap portions spaced apart sufficiently to permit free movement of the lever therebetween, said strap portions being deformed at the bearings therein to provide shoulders spaced just sufficiently to receive the lever therebetween and limit lateral movement of the lever at the bearings in the axial direction of the fulcrum pin.

28. A weighing scale comprising a support frame, weighing mechanism and a weight receiving platform carried by said frame, said platform being formed with a plurality of platform supports providing each a spaced pair of downwardly facing bearings, said weighing mechanism comprising levers each fitted with a bearing pin extending on opposite sides thereof and defining upwardly facing knife edges in position to engage the spaced bearings provided by one of said platform supports, said supports defining guide portions extending beyond said bearings at one end thereof to prevent lateral displacement of said bearing pins.

29. A weighing scale comprising a support frame, weighing mechanism and a weight receiving platform carried by said frame, said weighing mechanism comprising lever means carrying the platform and fulcrumed on the support and a resilient weight measuring element on which said levers are suspended, and means to connect said levers with the weighing element in such a way that the latter is deflected upwardly as the platform moves downwardly under the influence of a weight applied thereto.

30. A weighing scale comprising a support frame, weighing mechanism and a weight carrying platform carried by said frame, said weighing mechanism comprising lever means carrying the platform and fulcrumed on the frame and also a resilient weight measuring element carried by the platform and on which resilient weight measuring element said lever means is suspended whereby the weight-measuring element is deflected with respect to the platform by the lever means in response to the application of a weight on the platform, indicator means carried on said platform and actuated in accordance with the deflection of the weight measuring element.

31. A weighing scale comprising a a support frame, weighing mechanism and a weight receiving platform carried by said frame, said weighing mechanism comprising lever means carrying the platform and supported on the frame, and a resilient weight measuring element connected on the platform and on which element said lever means is suspended whereby to deflect the weight measuring element with respect to the platform in response to the application of a weight on the platform for measurement, said lever means comprising at least two levers extending in alignment at the heel of the scale assembly whereby tipping of the scale is minimized.

32. A weighing scale comprising a support frame, weighing mechanism and a weight receiving platform carried by said frame, said weighing mechanism comprising lever means carrying the platform and supported on the frame, and a resilient weight measuring element connected on the platform and on which element said lever means is suspended whereby to deflect the weight measuring element with respect to the platform in response to the application of a weight on the platform for measurement, said weighing mechanism comprising a plurality of independent levers each fulcrumed at remote portions of said frame, said levers having ends extending substantially to a common focal point for connection on the weight measuring element.

33. A weighing scale comprising a support frame, weighing mechanism and a weight receiving platform carried by said frame, said weighing mechanism comprising lever means carrying the platform and supported on the frame, and a resilient weight measuring element connected on the platform and on which element said lever means is suspended whereby to deflect the weight measuring element with respect to the platform in response to the application of a weight on the platform for measurement, an indicator comprising an element pivoted on the platform, and means to rotate said pivoted element in response to deflection of said measuring element.

34. A weighing scale comprising a support frame, weighing mechanism and a weight receiving platform carried by said frame, said weighing mechanism comprising lever means carrying the platform and supported on the frame, and a resilient weight measuring element connected on the platform and on which element said lever means is suspended whereby to deflect the weight measuring element with respect to the platform in response to the application of a weight on the platform for measurement, an indicator comprising an element pivoted on the platform, and driving means comprising a flexible element operatively connected with the measuring element and the pivoted element.

35. A weighing scale comprising a support frame, weighing mechanism and a weight receiving platform carried by said frame, said weighing mechanism comprising lever means carrying the platform and supported on the frame, and a resilient weight measuring element connected on the platform and on which element said lever means is suspended whereby to deflect the weight measuring element with respect to the platform in response to the application of a weight on the platform for measurement, an indicator comprising an element pivoted on the platform, driving means comprising a flexible element operatively connected with the measuring element and the pivoted element, and means to maintain the flexible element continuously under resilient tension.

36. A weighing scale comprising a support frame, weighing mechanism, a weight receiving platform carried by said frame, said weighing mechanism comprising a resilient leaf spring adapted to be deflected by the deposition of a weight on said platform and tiltable means drivingly connected with the indicator and having a bendable arm making engagement with said leaf spring at a point adjustable by bending said arm.

37. A weighing scale comprising a support frame, weighing mechanism comprising a counter-balanced system of levers carried by said frame, a weight receiving platform carried by said levers and an indicator carried by and movable with said platform, said indicator comprising a relatively stationary scale fixed on the platform and a movable pointer element pivoted on the platform to co-operate with the stationary element for the purpose of weight indication, and means for rotating the pivoted element on said platform in response to movement of said lever system under the influence of a weight on the platform.

38. A weighing scale comprising a support frame, weighing mechanism and a weight receiving platform carried by said frame, said weighing mechanism comprising lever means carrying the platform and supported on the frame and also a resilient weight measuring element connected on the platform and on which weight measuring element said lever means is suspended whereby the weight measuring element is deflected with respect to the platform by the lever means in response to the application of a weight on the platform for measurement, and indicator means carried on said platform and actuated in accordance with the deflection of the weight measuring element, said lever means having no direct mechanical fastening upon the support frame but simply resting on bearings formed in the frame whereby the lever means and the platform may be easily separated, as an assembly unit, from said frame.

39. A weighing scale as set forth in claim 6, wherein said platform comprises a drawn sheet metal shell, dependent means on said platform providing bearings, said levers having means forming knife edge projections in position to engage said bearings, reinforcing means secured in said shell and having portions underlying said platform for bracing and rigidifying the same, said bearings being formed on said bracing means whereby the force of a weight applied on the platform for measurement is transferred to the levers entirely through said bracing means, additional rigidifying means on said platform and operatively associated with said reinforcing means, an anchorage support for the resilient weight measuring element on said additional rigidifying means, means for anchoring the weight measuring element, at one end thereof, on said anchorage support, said anchorage support being spaced from said bearings and said reinforcing means, and additional rigidifying means serving to firmly mount the anchored end of the weighing element with respect to said bearings whereby to minimize errors due to deflection of the shell under the influence of a weight to be measured.

MATHIAS J. WEBER.
RUSSELL E. VANDERHOFF.